C. H. BIERBAUM.
SLIDE SHIFTING DEVICE FOR PROJECTION APPARATUS.
APPLICATION FILED AUG. 19, 1916.
1,226,176.
Patented May 15, 1917.
2 SHEETS—SHEET 1.
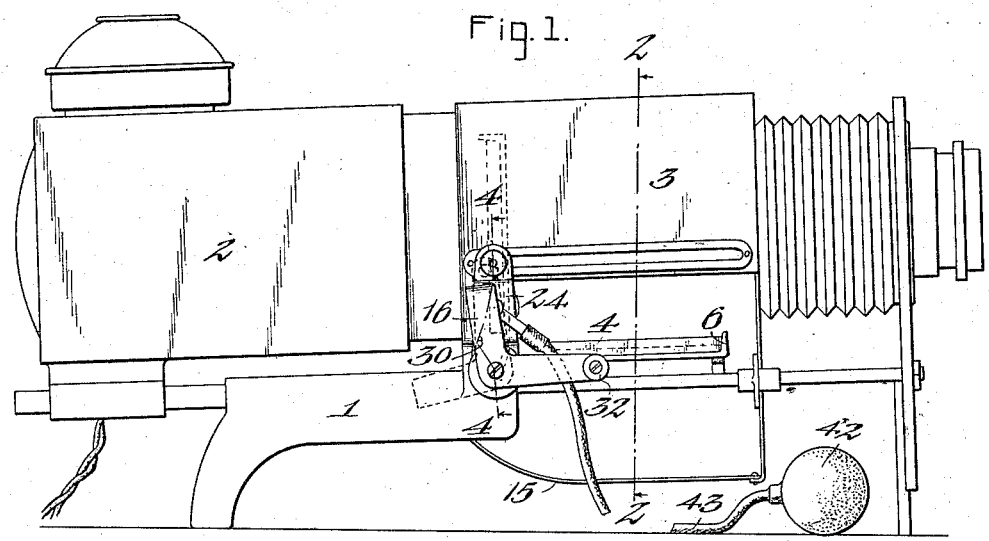
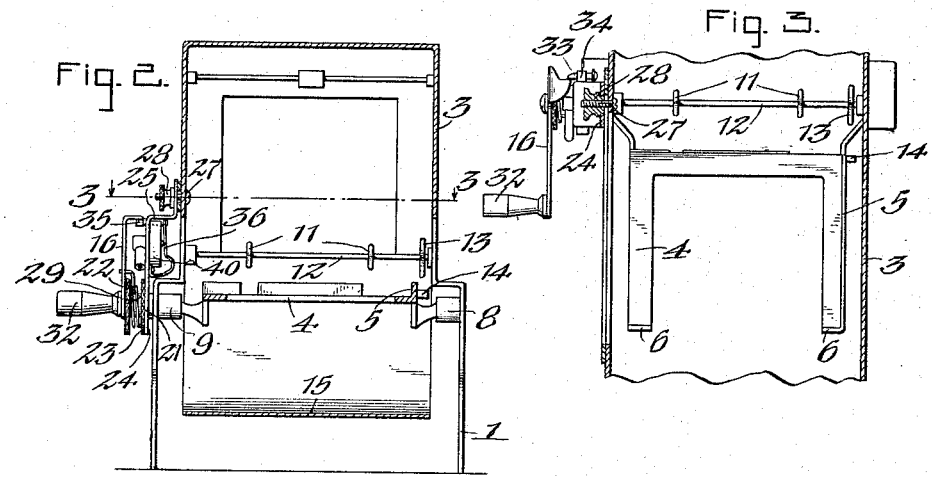
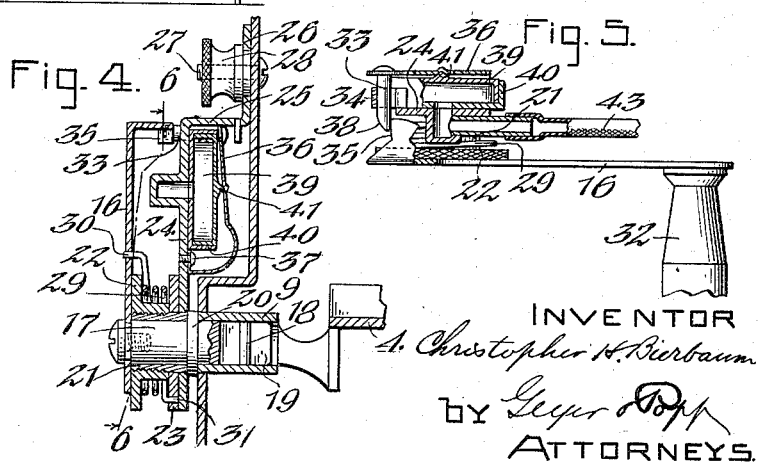
INVENTOR
Christopher H. Bierbaum
by Geyer & Popp
ATTORNEYS.

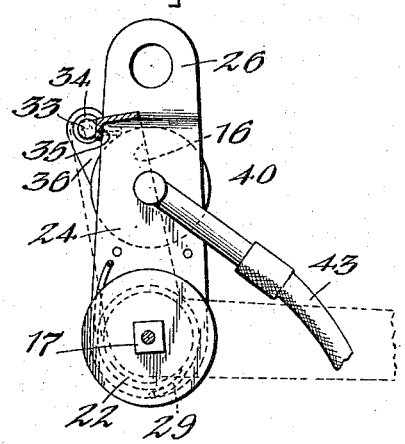
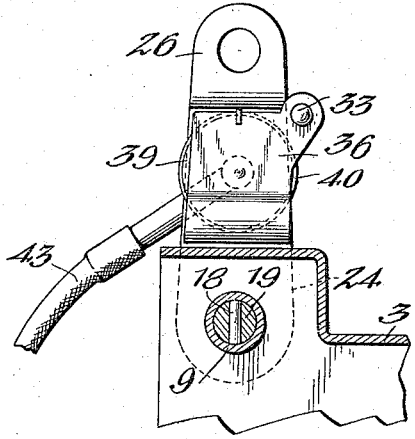
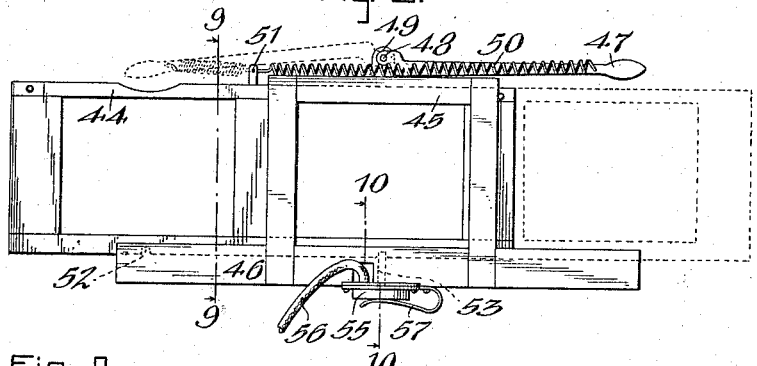
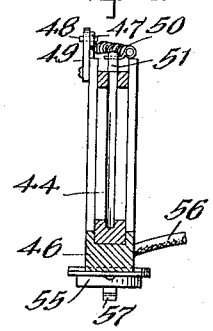
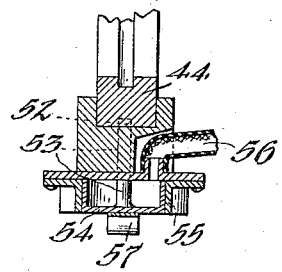

UNITED STATES PATENT OFFICE.

CHRISTOPHER H. BIERBAUM, OF BUFFALO, NEW YORK.

SLIDE-SHIFTING DEVICE FOR PROJECTION APPARATUS.

1,226,176.   Specification of Letters Patent.   Patented May 15, 1917.

Application filed August 19, 1916. Serial No. 115,850.

*To all whom it may concern:*

Be it known that I, CHRISTOPHER H. BIERBAUM, a citizen of the United States, residing at Buffalo, in the county of Erie and State of New York, have invented new and useful Improvements in Slide-Shifting Devices for Projection Apparatus, of which the following is a specification.

This invention relates to the class of projection apparatus employed for throwing the images of lantern-slides upon a screen, and more particularly to the means for changing or shifting the slides.

In such instruments as ordinarily constructed, the lantern-attendant has complete control of the slide-changing device which he operates whenever the speaker or lecturer gives him a predetermined signal. Owing to the failure of the attendant to hear or heed the speaker's signals or to respond to them promptly, the changing of the slides is often delayed, resulting in annoying interruptions of the lecture.

It is the object of my invention to overcome this objection by so organizing the slide-changing mechanism that the attendant is not given full control of it, but only loads the slide-carrier and sets or prepares it for action, while the speaker himself controls the shifting of the slides, thus insuring a prompt change of the pictures precisely when required and an uninterrupted delivery of the lecture.

In the accompanying drawings:

Figure 1 is a side elevation of a projection apparatus embodying the invention, the apparatus being of the type having a vertically-swinging slide-carrier. Fig. 2 is a transverse section on line 2—2, Fig. 1. Fig. 3 is a fragmentary horizontal section on line 3—3, Fig. 2. Fig. 4 is a transverse section, on an enlarged scale, on line 4—4, Fig. 1. Fig. 5 is a fragmentary horizontal section, on an enlarged scale, taken through the cylinder and piston and the lever-locking catch. Fig. 6 is a vertical longitudinal section on line 6—6, Fig. 4. Fig. 7 is a similar section on line 7—7, Fig. 4. Fig. 8 is an elevation of a reciprocating slide-carrier provided with the improvement. Fig. 9 is a transverse section on line 9—9, Fig. 8. Fig. 10 is an enlarged transverse section on line 10—10, Fig. 8.

Similar characters of reference indicate corresponding parts in the several views.

Referring to the embodiment of the invention shown in Figs. 1–7, 1 indicates the base of the projection apparatus, 2 the lamphouse, 3 the dark chamber and 4 the vertically-swinging fork or lantern-slide carrier upon which the attendant successively places the slides. In the construction shown in the drawings, the fork is of the usual U-form and provided at its far side with a stop-flange 5 and at its front ends with similar stop-flanges 6 for properly positioning the slides thereon, preparatory to elevating them into the dark chamber. The fork is provided with the usual arms 7 carrying hollow trunnions or pivots 8 and 9 which are journaled in the side walls of the base 1.

When in their upright, operative position, the slides are supported upon the usual starwheels 11 mounted on the transverse shaft 12 journaled in the side walls of the dark chamber. This shaft has the customary star-shaped actuating wheel 13 which is tripped and given a quarter turn by a pin 14 carried by the fork 4 whenever the latter is swung from its horizontal to its upright position, thereby rotating the star-wheel shaft rearwardly and discharging the upright slide upon the usual chute 15 from which the attendant removes it.

The parts so far described form no part of my invention and may be of any suitable or well-known construction.

16 indicates a vertically-swinging elbow-lever arranged at one side of the dark chamber 3 and secured to a horizontal rock-shaft 17. In the preferred construction shown in the drawings, this shaft is removably coupled to the adjacent fork-trunnion 8 by a transverse pin 18 secured within the trunnion and engaged by the slotted inner end of said shaft, as shown in Figs. 4 and 7. Surrounding the rock shaft 17 between a collar 20 thereof and the lever 16, is a sleeve 21, and mounted upon this sleeve is a clamping nut 22 which engages an external thread of the sleeve and bears against a washer 23 interposed between the inner end of said nut and a bracket or standard 24. This bracket is provided in its lower end with an opening through which the rock shaft 17 and the sleeve 21 pass, while the upper portion of the bracket is bent inwardly, as shown at 25, and terminates in a perforated ear 26 which bears against the adjacent wall of the dark chamber 3. The bracket is removably secured to this wall by a screw 27 passing through it and a clamping nut 28 engaging the screw and bearing against the outer side of the ear 26.

Coiled around the nut 22 is a spring 29 having one of its ends engaged with or secured to one of the arms of the elbow lever 16, as shown at 30, while its other end is secured to the washer 23, as shown at 31, in such a manner that when the attendant swings the elbow lever in the proper direction to lower the slide-fork 4, as shown in Fig. 1, the spring is tensioned and tends to return the fork to its upright position. The tension of this spring may be regulated, as required, by loosening the nut 22, turning the washer 23 in the proper direction and again tightening the nut to clamp the washer in place. The front arm of the elbow lever 16 has a suitable handle 32 for turning it to lower the fork and tension the spring 29. The lever is locked in the last-named position by a suitable device which is under the control of the lecturer and which may be of any appropriate construction. That shown in the drawings comprises a sliding bolt or spring catch 33 guided in a lug 34 on the bracket 24 and adapted to interlock with a lip 35 on the rear arm of the hand lever 16, as best shown in Figs. 5 and 6. This bolt is secured to the free upper end of a flat spring 36 arranged on the rear side of the bracket 24 and secured thereto at its lower end, as shown at 37, so that the spring tends to move the bolt forwardly into the path of the movement of the lever-lip 35 and interlock it with the lever. For this purpose, the outer end of the locking bolt is beveled on its front side, as shown at 38 in Fig. 5. The locking bolt is disengaged from the lever 16 by a horizontally movable piston 39 operating in a cylinder 40 secured to the inner side of the bracket 24, the piston-head being preferably provided with a projection 41 which engages the adjacent portion of the bolt-spring 36, as shown in Figs. 4 and 5. This piston is moved toward said spring to unlock said lever by air pressure produced by a suitable compressible bulb 42 in the hand of the lecturer, the bulb being connected with the cylinder 40 by a tube 43. Upon relaxing the pressure on the bulb, the spring 36 returns the piston to its initial position.

In the use of the apparatus, the attendant swings the elbow-lever 16 to the position shown in Fig. 1, thereby lowering the fork 4 and tensioning the coiled spring 29, the lever being automatically locked in that position by the spring-catch 33. Assuming that another slide has been previously elevated into the dark chamber by the upward movement of the fork, when the lecturer desires to change the slides, he simply compresses the bulb 42, causing the piston 39 to withdraw the locking bolt 33 from the lever 16. The coil-spring 29 thereupon reacts and returns the lever to its initial position, automatically elevating the fork and the contained slide and delivering the latter upon the star-wheels 11 where it remains until it is discharged by the next upward movement of the fork, as hereinbefore described. While the elevated slide is in its operative position, the attendant again lowers the fork to its horizontal position and places the next slide upon it, thus re-setting the fork ready for the next change of slides by the lecturer.

By the use of this mechanism, the lecturer himself has absolute control of the transposition of the slides, the attendant simply setting the fork or carrier and loading it ready to be released by the lecturer. There can therefore be no delays or interruptions such as frequently occur in the use of ordinary projection apparatus where the continuity of the lecturer is dependent upon the prompt coöperation of the attendant with the speaker.

The controlling device herein shown and described is readily applicable to existing as well as new apparatus of this character, as all of its parts are carried by the bracket 24 which is removably attached to the apparatus by the screw 27 and nut 28.

The invention is equally applicable to reciprocating slide-holders or carriers of the type having two slide-compartments adapted to be brought alternately into operative position. Such an embodiment of the invention is illustrated in Figs. 8, 9 and 10, where 44 indicates the slide-carrier which is guided in the usual stationary frame 45 mounted on the base 46. In this case a vertically swinging hand-lever 47 is pivoted at 48 to an ear 49 mounted centrally on the frame 45 so that the lever may be reversed from the position shown by full lines to that shown by dotted lines in Fig. 8. 50 is a shifting spring secured at one end to said lever near its free end and at its opposite end to a lug 51 arranged on the central portion of the slide-carrier. The latter is provided in its lower edge on opposite sides of its center with locking notches 52 with either of which a locking bolt or catch 53 is adapted to engage for locking the slide-carrier in one or the other of its positions. This bolt is carried by a piston 54 operating in a cylinder 55 secured to the underside of the base 46 and connected by a tube 56 with a pressure bulb, such as the bulb 42 of the first-described construction. A return spring 57 which bears against the head of the piston serves to hold the bolt in yielding engagement with either of the notches 52 of the slide-carrier.

In the use of this modified embodiment of the invention, assuming the slide-carrier 44 to be in the position shown by full lines in Fig. 8, it is locked by the engagement of the bolt 53 with its right hand notch 52. To tension or set the spring 50 for action, the attendant swings the lever 47 to the position shown by full lines in Fig. 8. When the lecturer compresses the bulb connected with the tube 56, the piston 54 is lowered in the cylinder 55 and withdraws the locking bolt from the notch of the slide-carrier, whereupon the spring 50 by its reaction shifts the carrier to the position shown by dotted lines in Fig. 8, thereby moving the right hand slide out of operative position and the left-hand slide into such position. By this action, the locking bolt engages the left-hand notch 52 of the carrier and again locks it. The operator then reverses the lever 47 to the position shown by dotted lines in Fig. 8, thus again tensioning the spring in such manner as to tend to shift the carrier to its former position which movement occurs upon the next compression of the bulb by the lecturer.

The locking bolt 33 can obviously be operated electrically instead of pneumatically, and the apparatus can be modified in other respects within the scope of the appended claims, and I do not therefore wish to be limited to the particular constructions herein shown and described.

I claim as my invention:—

1. In a projection apparatus, the combination of a slide-carrier, motive means for moving the carrier from one position to another to change the slides, means under the control of the attendant for setting said motive means ready for action, and means under the control of the lecturer for throwing said motive means into action to move the carrier.

2. In a projection apparatus, the combination of a slide-carrier, motive means for moving the carrier from one position to another to change the slides, means under the control of the attendant for rendering said motive means effective, means for holding the carrier against movement by said motive means, and means under the control of the lecturer for releasing said holding means.

3. In a projection apparatus, the combination of a slide carrier, means for automatically moving the carrier from one position to another to change the slides, means for holding the carrier against movement by said automatic means, and means under the control of the lecturer for releasing said holding means to permit said automatic means to move the carrier.

4. In a projection apparatus, the combination of a slide carrier, means for automatically moving the carrier from one position to another to change the slides, means under the control of the attendant for rendering said automatic means effective, means for holding the carrier against movement by said automatic means, and means remote from the apparatus for releasing said holding means.

5. In a projection apparatus, the combination of a slide carrier, means for locking the carrier against movement from one position to another, a spring for moving the carrier to change the slides, means under the control of the attendant for tensioning said spring, and means under the control of the lecturer for releasing said locking means.

6. In a projection apparatus, the combination of a slide carrier, means for automatically moving the carrier from one position to another to change the slides, means for holding the carrier against movement by said automatic means, a pressure cylinder, a piston in said cylinder for releasing said holding means, and means under the control of the lecturer for actuating said piston.

7. In a projection apparatus, the combination of a slide-carrier, manual means under the control of the attendant for moving the slide-carrier from its delivery position to its loading position, a spring cooperating with said manual means to be tensioned by the movement of the slide-carrier to loading position, means for locking said manual means in position to maintain said spring under tension, and means under the control of the lecturer for releasing said locking means.

8. In a projection apparatus, the combination of a swinging slide-carrier, a lever for operating the carrier, a spring connected with said lever and tensioned by the movement of the carrier from its delivery position to its loading position, a catch for locking the lever in the tensioned condition of the spring, and means for withdrawing said catch to release the lever.

9. In a projection apparatus, the combination of a swinging slide-carrier, a lever for operating the carrier, a spring connected with said lever and tensioned by the movement of the carrier from its delivery position to its loading position, a catch for locking the lever in the tensioned condition of the spring, a pressure cylinder, a piston in said cylinder for withdrawing said catch, and means for delivering compressed air into said cylinder.

10. In a projection apparatus, the combination of a swinging slide-carrier, a rock shaft connected with said carrier and having an operating lever, a spring coiled about said shaft and connected with said lever to be tensioned by the return of the carrier from its delivery position to its loading position, a catch for locking the lever when the spring is tensioned, and means under the control of the lecturer for withdrawing said catch.

11. An attachment for a projection apparatus comprising a support, a rock lever journaled in said support and adapted to engage the slide-carrier of the apparatus, a spring arranged to be tensioned by said lever when the latter is turned to swing the carrier to its loading position, a locking catch carried by said support and engaging said lever, and a releasing device for said catch mounted on said support.

12. An attachment for a projection apparatus, comprising a support, a rock lever journaled in said support and adapted to engage the slide-carrier of the apparatus, a spring arranged to be tensioned by said lever when the latter is turned to swing the carrier to its loading position, a locking catch carried by said support and engaging said lever, a pressure cylinder mounted on said support, a piston in said cylinder for releasing said catch, and means for actuating said piston.

13. In a projection apparatus, the combination of a swinging slide carrier, a rock shaft connected with said carrier and having an operating lever, a sleeve surrounding said shaft, a washer mounted on said sleeve and capable of rotary adjustment thereon, a clamping nut engaging said sleeve and bearing against said washer, a spring coiled around said nut and secured at one end to said washer and at its other end to said lever, a locking device for said lever, and means for releasing said locking device.

CHRISTOPHER H. BIERBAUM.

Copies of this patent may be obtained for five cents each, by addressing the "Commissioner of Patents, Washington, D. C."